Figure 1:
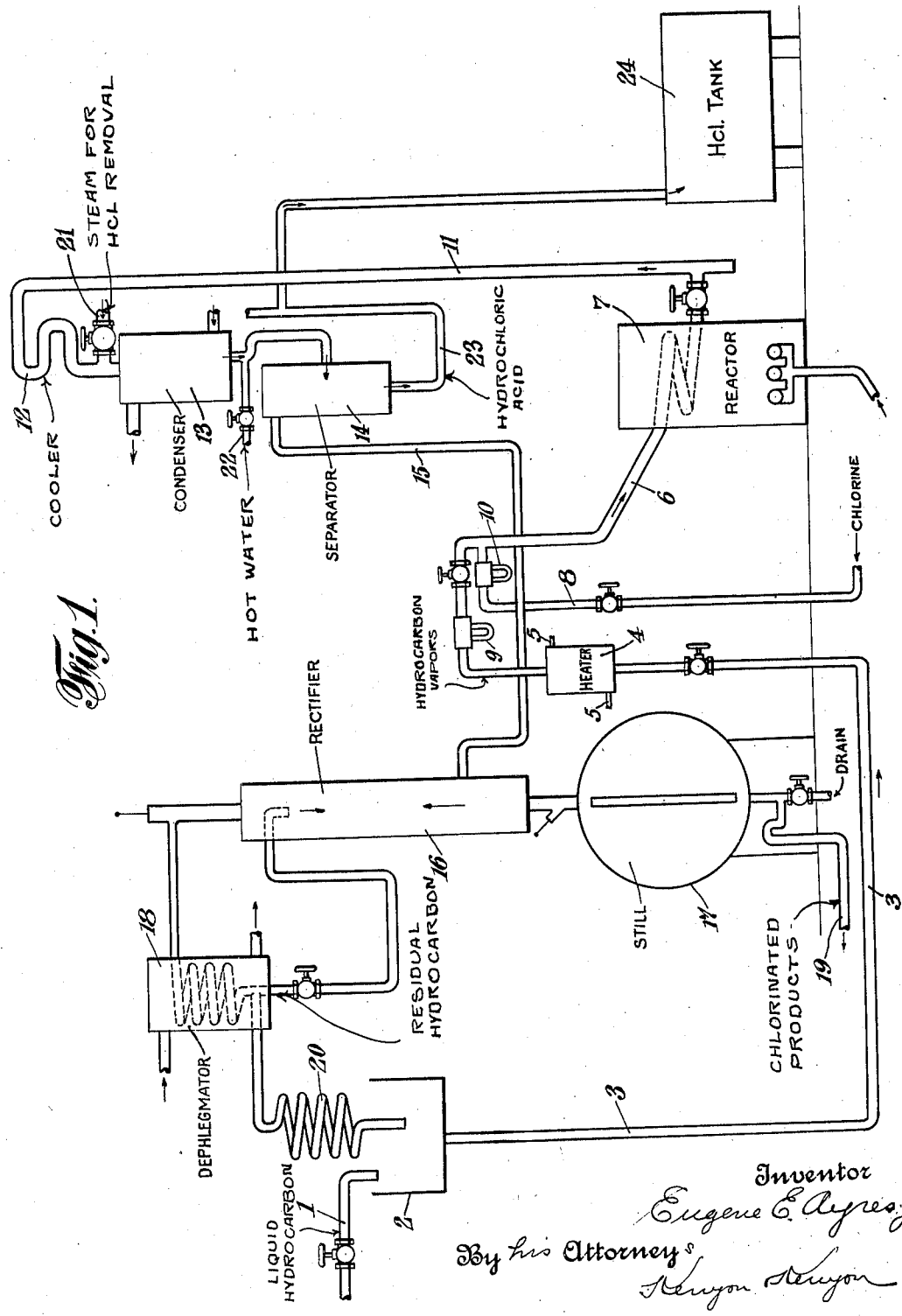

Dec. 31, 1929.          E. E. AYRES, JR          1,741,393
                         CHLORINATION
                     Filed July 22, 1925        2 Sheets-Sheet 2

Fig. 2.

Inventor
Eugene E. Ayres, Jr.
By his Attorneys
Kenyon & Kenyon

Patented Dec. 31, 1929

1,741,393

UNITED STATES PATENT OFFICE

EUGENE E. AYRES, JR., OF SWARTHMORE, PENNSYLVANIA, ASSIGNOR TO THE B. A. S. COMPANY, OF PHILADELPHIA, PENNSYLVANIA, A CORPORATION OF DELAWARE

CHLORINATION

Application filed July 22, 1925. Serial No. 45,436.

My invention relates to a method and apparatus for the chlorination of liquid hydrocarbons, particularly to the end that monochlorides thereof may be obtained.

An object of my invention is to provide a method and apparatus whereby chlorides and particularly monochlorides of liquid hydrocarbons and particularly pentane and butane may be produced in a continuous operation that is safe and economical.

In the practice of my invention liquid hydrocarbon is vaporized and mixed in controlled proportion with chlorine gas, the proportion preferably being one part of chlorine gas with fifteen to twenty parts of hydrocarbon vapor. The mixture is caused to react by the application of heat at a temperature between 600° F. and 700° F. preferably a temperature of about 650° F. The products of the reaction are then either cooled to the lowest available temperature for the condensation of hydrocarbon and the chloride of the hydrocarbon or else the products of the reaction are merely cooled to the point where they may be introduced into a rectifying column in which the chlorinated product is recovered and the residual hydrocarbon is completely freed from the chlorinated product. Vapors of the hydrocarbon leaving the rectifying column are condensed and re-introduced into the system. Hydrochloric acid produced in the process is removed, as hereinafter described, before returning the residual hydrocarbon to the system.

If the products of the reaction are cooled to the lowest available temperature the resulting liquid is passed directly to a rectifying column having the usual still and dephlegmator, the residual hydrocarbon being therein revaporized and completely freed of the chlorinated product. After cooling the residual hydrocarbon is returned to the system.

If it is not desired to cool the products of the reaction to the lowest available temperature they may be cooled to a temperature at which they may be introduced to the rectifier, e. g. 200° F., and then the separation of residual hydrocarbon from chlorinated products is effected in the rectifier.

The hydrochloric acid produced in my chlorination process may be removed by simply withdrawing it as a gas from the chamber in which is collected the residual hydrocarbon that is condensed from the vapors leaving the rectifier. As an alternative steam may be introduced to the products of the reaction before they are cooled or after they have been only partly cooled and then the products condensed by the further cooling are passed through a separator in which aqueous hydrochloric acid is separated out. Or, hot water may be introduced into the products of the reaction as they pass from the cooler to the separator. The chlorinated product and residual hydrocarbon recovered in the separator are in this case passed in a liquid form to the rectifying column.

Other and further objects and advantages of my invention will appear from the following description taken in connection with the accompanying drawings, in which Fig. 1 diagrammatically shows apparatus embodying and whereby my invention may be practiced, and Fig. 2 shows diagrammatically a modified form of the apparatus shown in Fig. 1.

Referring to the drawing the hydrocarbon is supplied from any convenient source through the pipe 1 which leads for reasons of convenience hereinafter appearing, into a collecting tank 2 from which the hydrocarbon is led through the pipe 3 into a heater 4 that may be heated in any convenient manner as by circulating steam through the feed pipes 5. The hydrocarbon is vaporized in the heater 4 and passes through the pipe 6 to the reactor 7. Leading into the pipe 6 is a pipe 8 through which chlorine gas is brought into contact with the hydrocarbon vapor passing through the pipe 6. The flow of vapor through the pipe 6 may be indicated by any convenient means such as a manometer 9 and a similar manometer 10 may be used to indicate the flow of chlorine through the pipe 8.

The reactor 7 may be of very simple construction and consist merely of a device for supplying sufficient heat, as by means of gas burner 30, to the pipe 6 to bring the hydrocarbon vapor and chlorine therein to a temperature between 600° F. and 700° F., a pipe still being satisfactory for the purpose of producing the reaction.

The products of the reaction pass from the reactor through the pipe 11 and may be preliminarily cooled by means of an air condenser 12, after which the products of the reaction may be further cooled in the condenser 13. The cooling may, as desired, bring the products of the reaction to a temperature at which they may be introduced into a rectifying column or the products may be cooled to the lowest available temperature. If the products of the reaction are cooled to the lowest available temperature they may then be passed through a separator 14 for the purpose hereinafter set forth and through the pipe 15 to a rectifying column 16 that is provided with the usual still 17 and a dephlegmator 18. The chlorinated hydrocarbon may be withdrawn from the still by a drain 19 while the vapors passing from the dephlegmator 18 pass through the cooling coil 20 wherein residual hydrocarbon is condensed and is collected in the collecting tank 2 and passed again to the apparatus.

In order to remove the hydrochloric acid that is produced by the reaction in the reactor 7 steam may be introduced by the pipe 21 before the products pass into the condenser 13 or hot water may be introduced through the pipe 22 and mixed with the condensate leaving the condenser 13. Aqueous hydrochloric acid is thereby produced that is separated from the chlorinated hydrocarbon and the residual hydrocarbon in the separator 14 and passes through the pipe 23 to the hydrochloric acid tank 24.

From the foregoing it will be apparent that chlorine and the vapor of the hydrocarbon are being introduced into the system at appreciable velocity, as more fully set out and claimed in my copending application, Ser. No. 165,876, filed February 4th, 1927. The velocity of the mixture of gases insures that there will be no explosion from the point of introduction up to the reactor. The time during which the gases are in the reactor is made sufficient to insure a complete reaction. No chlorine is present as such in the vapors passing out of the reactor and therefore accumulation of chlorine in any part of the apparatus beyond the reactor is not possible. In the practice of my invention and in the use of apparatus embodying the same a sufficient excess of hydrocarbon is maintained to insure the formation of monochlorides and to prevent formation of di-chlorides.

In the simplified construction diagrammatically shown in Fig. 2 the supply of hydrocarbon and the mixing thereof with chlorine are carried out by the apparatus for that purpose above described and the pipe 6 containing the mixture is preliminarily heated by passing through a heat exchanger 25 and then conducted to the reactor 7. The products of the reaction are then conducted by the pipe 26 through the heat exchanger 25 and then to a cooling device 27 that may be of any desired form and in which the products of the reaction are cooled to the temperature in the neighborhood of 200° F. The products of the reaction are then conducted to the rectifying tower 16 that is provided with the usual still 17. The chlorinated product is withdrawn from the still through the pipe 19 and the vapors from the still which consist mainly of hydrocarbon are passed through the dephlegmator 18 to a cooling coil 20 in which the hydrocarbons are condensed. The hydrocarbons are then collected in the collecting tank 2 and hydrochloric acid gas is withdrawn from the collecting tank 2 through the pipe 28 and disposed of in any desired manner.

In the practice of my invention the hydrocarbon is vaporized at a temperature of about 100° F. prior to being mixed with the chlorine and the hydrocarbon vapors are cooled to a temperature well below 100° F. prior to being introduced into the collecting tank 2. It is to be understood, however, that the several temperatures mentioned herein are only approximate and are to be considered as illustrative as they may be varied under different conditions. In this connection it is pointed out that it is obvious that mixtures of chlorine and hydrocarbon vapors passing through the reactor usually do not attain as high a temperature as the temperature of the reactor itself, it being desirable to raise the temperature of the mixture itself to a point that is but little above the temperature that will produce by heat the desired reaction between chlorine and the particular hydrocarbon that is being chlorinated. Thus, actual temperatures of the mixture itself as low as 536° F., or lower will effect satisfactory chlorination of pentanes, while higher temperature may be desirable for chlorination of pentane and may be desirable or necessary for chlorination of other hydrocarbons.

What I claim and desire to secure by Letters Patent of the United States is:

1. In the production of monochlorides of saturated hydrocarbons having four to seven carbon atoms, the steps comprising vaporizing the hydrocarbon, mixing the hydrocarbon vapor with a lesser volume of chlorine gas, passing the mixture to a heating operation and thereby heating the mixture to a temperature sufficiently elevated to produce a preponderance of monochlorides in the absence of actinic rays and in the absence of electric discharge, and separating the chlorinated hydrocarbon from the products passing from the heating operation.

2. In the production of monochlorides of pentane, the steps comprising vaporizing pentane, mixing the pentane vapor with a lesser volume of chlorine gas, passing the mixture to a heating operation and thereby heating the mixture to a temperature sufficiently elevated to produce a preponderance of monochlorides in the absence of actinic rays and in the absence of electric discharge, and separating the chlorinated pentane from the products passing from the heating operation.

3. In the production of monochlorides of saturated hydrocarbons having more than two carbon atoms, the steps comprising mixing the vapor of the hydrocarbon with a lesser volume of chlorine gas, passing the mixture to a heating operation and thereby heating the mixture to a temperature sufficiently elevated to produce a preponderance of monochlorides and to completely react the chlorine in the absence of actinic rays and in the absence of electric discharge, and separating the chlorinated hydrocarbons from the products passing from the heating operation.

4. In the production of monochlorides of saturated hydrocarbons having more than two carbon atoms, the steps comprising mixing the vapor of the hydrocarbon with a lesser volume of chlorine gas, passing the mixture to a heating operation and thereby heating the mixture to a temperature sufficiently elevated to produce a preponderance of monochlorides in the absence of actinic rays and in the absence of electric discharge, cooling the products passing from the heating operation, and subjecting the cooled products to rectification and thereby separating the chlorinated product from vapors of the hydrocarbon.

5. In the production of monochlorides of saturated hydrocarbons having more than two carbon atoms, the steps comprising mixing the vapor of the hydrocarbon with a lesser volume of chlorine gas, passing the mixture to a heating operation and thereby heating the mixture to a temperature sufficiently elevated to produce a preponderance of monochlorides in the absence of actinic rays and in the absence of electric discharge, continuously withdrawing from the heating operation the products of the reaction and reducing the temperature of said products, and subjecting the cooled products of the reaction including the hydrocarbon and chlorine products thereof to rectification in a column and by further cooling therein producing a liquid fraction containing chlorine products of the hydrocarbon and a separate vapor fraction substantially free of chlorine products of the hydrocarbon and containing the hydrocarbon in vapor phase.

6. In the production of monochlorides of saturated hydrocarbons having more than two carbon atoms, the steps comprising mixing the vapor of the hydrocarbon with a lesser volume of chlorine gas, passing the mixture to a heating operation and thereby heating the mixture to a temperature sufficiently elevated to produce a preponderance of monochlorides in the absence of actinic rays and in the absence of electric discharge, introducing moisture into the products of the heating operation and cooling and separating the resulting mixture, withdrawing resulting aqueous hydrochloric acid separated in the separating operation, and subjecting the acid-freed residue to rectification and separating chlorinated hydrocarbon and residual hydrocarbon.

7. In the production of monochlorides of saturated hydrocarbons having four to seven carbon atoms, the steps comprising vaporizing the hydrocarbon, mixing the hydrocarbon vapor with a lesser volume of chlorine gas, passing the mixture to a heating operation and thereby heating the mixture to a temperature sufficiently elevated to produce a preponderance of monochlorides in the absence of actinic rays and in the absence of electric discharge, and subjecting products of the heating operation including the hydrocarbon and chlorine products thereof to rectification in a column and by further cooling therein producing a liquid fraction containing chlorine products of the hydrocarbon and a separate vapor fraction substantially free of chlorine products of the hydrocarbon and containing the hydrocarbon in vapor phase.

8. In the chlorination of saturated hydrocarbons having more than two carbon atoms, the steps comprising mixing the vapor of the hydrocarbon with a lesser volume of chlorine gas, passing the resulting mixture through a heated reactor, while heat is applied at temperatures of the order of 600° F., at such rate that complete reaction of the chlorine occurs and monochlorides are produced by the reaction resulting from the heat, continuously withdrawing from the reactor the products of the reaction, and separating the chlorinated hydrocarbon from the withdrawn products.

In testimony whereof, I have signed my name to this specification.

EUGENE E. AYRES, Jr.